F. P. McDERMOTT, Jr. & W. O. KENNINGTON.
GEARING.
APPLICATION FILED MAY 25, 1912. RENEWED JUNE 21, 1917.

1,253,263.

Patented Jan. 15, 1918.
2 SHEETS—SHEET 1.

WITNESSES:
A. H. Edgerton
O. W. McLaughlin

INVENTOR.
Franklin P. McDermott Jr
William O. Kennington.
BY
V. H. Lockwood
ATTORNEY.

F. P. McDERMOTT, Jr. & W. O. KENNINGTON.
GEARING.
APPLICATION FILED MAY 25, 1912. RENEWED JUNE 21, 1917.
1,253,263.
Patented Jan. 15, 1918.
2 SHEETS—SHEET 2.
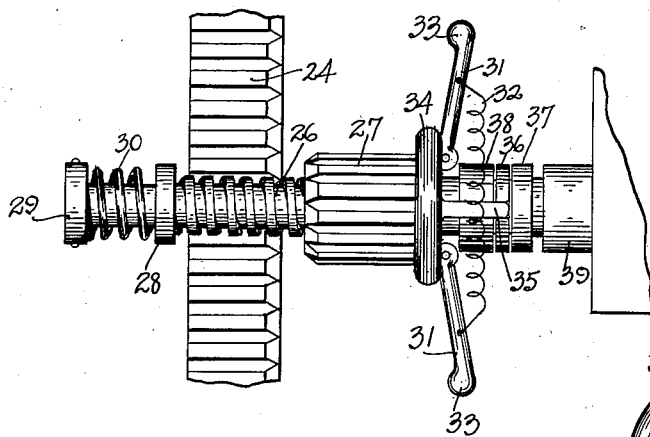
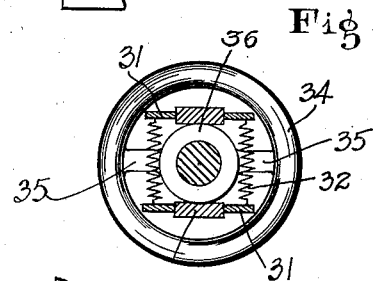
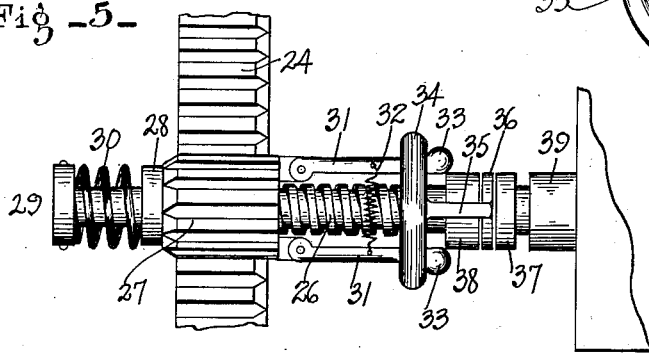
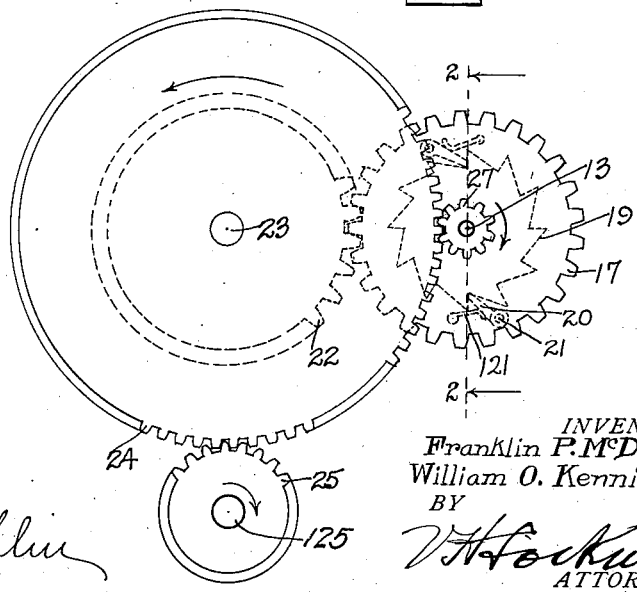
WITNESSES:
A. H. Edgerton
O. M. McLaughlin
INVENTOR.
Franklin P. McDermott Jr.
William O. Kennington.
BY
J. H. Lockwood
ATTORNEY.

UNITED STATES PATENT OFFICE.

FRANKLIN P. McDERMOTT, JR., AND WILLIAM O. KENNINGTON, OF ANDERSON, INDIANA, ASSIGNORS, BY MESNE ASSIGNMENTS, TO ECLIPSE MACHINE COMPANY, OF ELMIRA, NEW YORK, A CORPORATION OF NEW YORK.

GEARING.

1,253,263.  Specification of Letters Patent.  Patented Jan. 15, 1918.

Application filed May 25, 1912, Serial No. 699,650. Renewed June 21, 1917. Serial No. 176,251.

*To all whom it may concern:*

Be it known that we, FRANKLIN P. MC-DERMOTT, Jr., and WILLIAM O. KENNINGTON, a citizen of the United States and a subject of King George of Great Britain, respectively, and residents of Anderson, in the county of Madison and State of Indiana, have invented a certain useful Gearing; and we do hereby declare that the following is a full, clear, and exact description thereof, reference being had to the accompanying drawings.

The object of this invention is to provide an improved starter for internal combustion engines, wherein while the engine is running, an electric generator is driven by the crank shaft of the engine and electricity is stored and when it is desired to start the engine after it has ceased running, an electric machine is driven from the storage battery and in turn it actuates the crank shaft until the engine is started.

Figure 1:
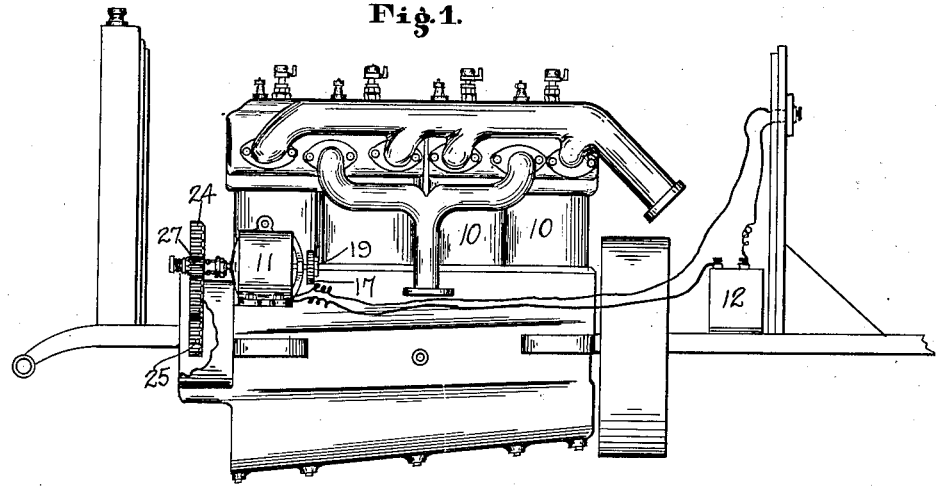
Figure 2:
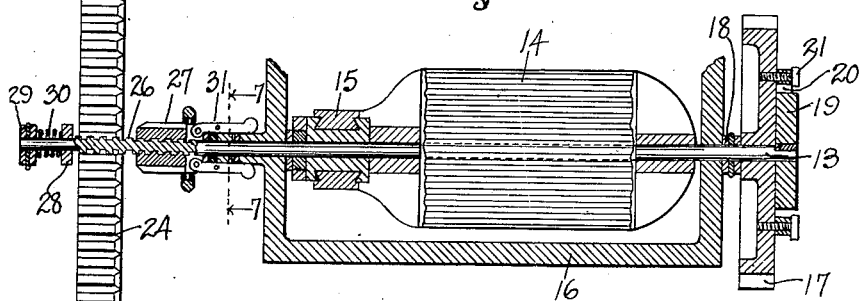
Figure 3:
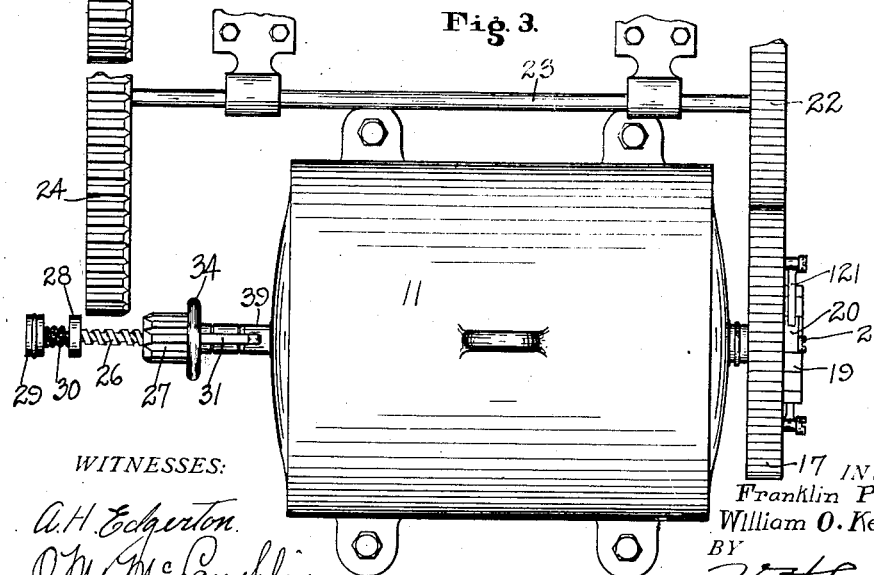

The nature of the invention will be understood from the accompanying drawings and the following description and claims:

In the drawings, Figure 1 is a portion of the forward end of an automobile with this invention installed thereon. Fig. 2 is a vertical longitudinal section on the line 2—2 of Fig. 6. Fig. 3 is a plan view on a larger scale of the left-hand portion of Fig. 1. Fig. 4 is a side elevation on a larger scale of the portion of the mechanism shown in Fig. 1, with the driving pinion disengaged and in its inoperative position. Fig. 5 shows the same, but with the pinion in mesh with the driving gear. Fig. 6 is a left-end elevation of a portion of Fig. 1. Fig. 7 is a section on the line 7—7 of Fig. 2.

In detail there is shown in the drawings a portion of the front end of an automobile having an internal combustion engine 10 mounted thereon and adapted to drive an electric machine 11 for furnishing current for charging a battery 12 or for other uses, such as ignition, lighting, etc., and by suitable means, hereafter described, the current from the storage battery may be used for driving the electric machine as a motor for the purpose of starting the engine. As shown in Fig. 2, a shaft 13 of the electric machine which carries the usual armature winding 14 and commutator 15, has bearings within the frame 16 of the machine and extends beyond the same upon either end. A gear 17 is loosely mounted upon the shaft 13 to the right of the frame 16 and is secured against longitudinal movement thereon by a collar 18 and a ratchet 19 secured to said shaft. Pawls 20 are mounted upon studs 21 screwed into the gear 17 and are pressed into engagement with the teeth of the ratchet 19 by means of the springs 121 also mounted upon said gear. The gear 17 meshes with a gear 22, as shown in Fig. 3, upon the right hand end of the shaft 23. Upon the other end of the shaft 23 there is a gear 24 meshing with a gear 25 upon the crank shaft 125 to the engine. The particular means for driving the shaft 23 from the crank shaft is immaterial to this invention as it may be driven in many different ways, either directly or through intermediate gearing.

Near the left hand end, the shaft 13 has an externally threaded portion 26 and the extreme outer end of the shaft is reduced in diameter. An internally threaded pinion 27 is screwed onto the threaded portion 26 of the shaft 13 and its movement to the left toward the end of the shaft is limited by means of a collar 28 which surrounds the shaft and is free to slide thereon and a collar 29 secured upon the end of the shaft with a spring 30 surrounding the shaft and lying between the collars 28 and 29, said collars and spring serving as a spring buffer to gradually stop the outward movement of the pinion 27. As shown in detail in Figs. 4 and 5, to the right hand end of the pinion 27, arms 31 are pivoted, and springs 32 tend to draw the arms toward the position shown in Fig. 2. The right hand end or free end of said arms 31 have enlarged portions 33, the inner side of which bear against a projection 39 from the frame 16, for the purpose hereafter described. Surrounding the arms 31, in the position shown in Fig. 5, there is a ring or collar 34 which is secured by means of arms 35 to a collar 36 which is free to rotate upon the shaft 13, but is prevented from longitudinal movement thereon by collars 37 and 38 secured to the shaft 13.

The operation of the invention is as follows:

When the engine 10 is at rest, the various parts will assume the position shown in Fig. 2, in which the pinion 27 and gear 24 are out of mesh. When it is desired to start the engine, electric energy is supplied from storage battery 12 to the electric machine 11, causing it to act as a motor and rotate the shaft 13 in the direction of the arrow shown in Fig. 6. The ends of the arms 31 being drawn in by the spring 32 and bearing against the projection or boss 39, tend to produce a slight friction and prevent the rotation of the pinion 27. Thus the rotation of the shaft 13 will cause the pinion 27 to move along the threaded end 26 of said shaft and into mesh with the gear 24 and through the gear 25 will turn the crank shaft in the engine, and allow the engine to be started. The teeth of the pinion 27 and of the gear 24 are preferably chamfered upon the ends upon which they engage to allow the engagement to take place more readily. After their engagement the pinion continues to travel longitudinally of the shaft 13 until it strikes the buffer collar 28 which gradually stops its further movement. This brings the parts to the position shown in Fig. 5, where the arms 31 are shown lying within the collar 34 excepting for the enlarged ends 33. During this movement of the shaft 13 the pawls 20 have allowed the ratchet 19 to turn without turning the gear 17. The ability of the collar 28 to yield permits such further movement of pinion 27 on the threads 26 of shaft 12 as may be necessary to cushion the shock due to the strain of starting gear 24 and the engine. The pinion 27 does not start gear 24 until the pinion is thus yieldingly stopped by collar 28. This permits some play between shaft 13 and the starting pinion.

As soon as the engine starts and begins to run by its own power its speed rapidly increases and the pinion 27, driven by the gear 24, revolves faster than the shaft 13 which is driven by the electric machine acting as a motor. This increase of speed by the pinion 27 over that of the shaft 13 will cause said pinion to move to the right along the threaded portion 26 of the shaft until it is out of mesh with the gear 24, after which the shaft 13 will be driven from the shaft 33 through the gears 22 and 17 and the ratchet 19. The arms 31 passing out from within the ring 34, will fly outwardly against the action of the spring 32 due to centrifugal force. The extreme right-hand movement of the pinion will be stopped by the collar 38, where it will be held by the action of the arms 31. While the pinion 27 is moving toward the right, the arms 31 will, of course, press against the inside of the ring 34, but as the collar 36 to which the ring 34 is secured may rotate freely upon the shaft 13, the speed of the pinion 27 will not be decreased by the friction of the arms 31 against the ring 34 and its momentum will carry it to the right a sufficient distance that it will clear the teeth of the gear 24 by a slight amount. Thereafter, the electric machine will act as a generator and be driven by the crank shaft of the engine and electricity therefrom will be stored in the storage battery for use, as desired.

The design of the gears is such that the motor may revolve relatively fast compared with the engine during the starting period, but when the engine is started and it is desired to drive the electric machine as a generator for the generation of current, the ratio of speed between the engine and electric machine should be much lower than that during the starting operation and the gears 17 and 22 are designed accordingly. Thus the engine cannot drive the electric machine at an excessive speed and injure the machine or its gearing. After disengagement the action of the arms 31 will tend to keep the pinion against the collar 38 and prevent its reëngagement with the gear 24.

We claim as our invention:

1. In an engine starting apparatus, the combination of a shaft provided with a threaded portion, a gear adjacent said shaft and connected with the engine, a pinion internally threaded and mounted on the threaded portion of the shaft, a motor for driving said shaft, centrifugal arms connected with said pinion, and means coöperating with said arms to withhold the pinion from reëngagement with the gear after the engine has started.

2. A gear, a shaft provided with a threaded portion extending near said gear, a pinion loosely mounted on the threaded portion of said shaft so that when the shaft is revolved said pinion will travel into engagement with and drive the gear, centrifugal arms pivotally mounted in connection with said pinion tending to retard the revoluble movement of said pinion, and a circular member mounted on and operating with said shaft through which said arms will extend and be held inward when said pinion is in mesh with said gear, whereby when said gear attains a high speed and drives said pinion the latter will attain a higher speed than said threaded shaft and will travel on said shaft out of engagement with said gear.

3. A gear, a shaft provided with a threaded portion extending near said gear, a pinion loosely mounted on the threaded portion of said shaft so that when the shaft is revolved said pinion will travel into engagement with and drive the gear, centrifugal arms pivotally mounted in connection with said pinion, a circular member mounted on and operating with said shaft through which said arms will extend and be held inward when said pinion is in mesh with said gear, whereby when said gear attains a high speed and drives said pinion the latter will be driven at a higher speed than said threaded shaft and will travel on said shaft out of engagement with said gear, and a spring normally holding said centrifugal arms in collapsed position.

4. A gear, a shaft provided with a threaded portion extending near said gear, a pinion loosely mounted on the threaded portion of said shaft so that when the shaft is revolved said pinion will travel into engagement with said gear, centrifugal arms pivotally mounted in connection with said pinion, a collar secured on said shaft, and a circular member carried by said collar in position to surround said centrifugal arms when the pinion is in mesh with said gear and from which circular member said arms escape when the pinion is disengaged from said gear.

5. A gear, a shaft provided with a threaded portion extending near said gear, a pinion loosely mounted on and engaging the threaded portion of said shaft so that when the shaft is revolved said pinion will travel into engagement with and drive said gear, centrifugal arms pivotally mounted in connection with said pinion and adapted in their inner position to engage a portion of and retard the initial revoluble movement of said pinion and in their outer position to retard the revoluble movement of said pinion, and a circular member mounted on and operating with said shaft through which said arms will extend and be held inward when said pinion is in mesh with said gear, whereby when said gear attains a high speed and drives said pinion the latter will attain a higher speed than said threaded shaft and will travel on said shaft out of engagement with said gear.

In witness whereof, we have hereunto affixed our signatures in the presence of the witnesses herein named.

FRANKLIN P. McDERMOTT, Jr.
W. O. KENNINGTON.

Witnesses:
RANDALL I. VAN WINKLE,
WM. FENTON ARMSTRONG.